United States Patent
Jenkinson

(10) Patent No.: US 9,945,434 B2
(45) Date of Patent: Apr. 17, 2018

(54) BRAKE ASSEMBLY WITH ANCHOR PIN RETENTION

(71) Applicant: ArvinMeritor Technology, LLC, Troy, MI (US)

(72) Inventor: Scott A. Jenkinson, Davisburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 28 days.

(21) Appl. No.: 15/070,182

(22) Filed: Mar. 15, 2016

(65) Prior Publication Data
US 2017/0268589 A1    Sep. 21, 2017

(51) Int. Cl.
| F16D 51/00 | (2006.01) |
| F16D 65/09 | (2006.01) |
| F16D 51/28 | (2006.01) |

(52) U.S. Cl.
CPC ............ *F16D 65/09* (2013.01); *F16D 51/28* (2013.01); *F16D 2051/003* (2013.01)

(58) Field of Classification Search
CPC .......... F16D 65/09; F16D 51/28; F16D 65/08; F16D 51/52; F16D 2051/003; B60T 1/06; B60T 1/067
See application file for complete search history.

(56) References Cited

U.S. PATENT DOCUMENTS

| 2,239,916 | A | * | 4/1941 | Hunt | F16D 51/52 188/152 |
| 2,614,663 | A | * | 10/1952 | Joseph | F16D 65/09 188/341 |
| 3,136,390 | A | * | 6/1964 | Zukowski | F16D 65/09 188/206 A |
| 3,314,507 | A | * | 4/1967 | Tantlinger | F16D 65/09 188/206 A |
| 4,353,442 | A |  | 10/1982 | Correa | |
| 4,526,254 | A | * | 7/1985 | Baltare | F16D 65/08 188/206 A |
| 4,858,729 | A | * | 8/1989 | Crewson | B60T 1/06 188/205 R |
| 5,325,945 | A | * | 7/1994 | Walker | B60T 1/067 188/206 A |
| 6,648,111 | B2 | * | 11/2003 | Catania | F16D 51/20 188/206 A |
| 7,351,000 | B2 | * | 4/2008 | Meggiolan | B62K 25/02 280/279 |
| 9,004,244 | B2 |  | 4/2015 | Dettloff et al. | |
| 2015/0122603 | A1 |  | 5/2015 | Dettloff et al. | |

OTHER PUBLICATIONS

United States Patent and Trademark Office, U.S. Appl. No. 14/340,800, filed Jul. 25, 2014.
Arvinmeritor, Maintenance Manual 4, Cam Brakes and Automatic Slack Adjusters, Revised Jan. 2005.

* cited by examiner

*Primary Examiner* — Pamela Rodriguez
(74) *Attorney, Agent, or Firm* — Brooks Kushman P.C.

(57) ABSTRACT

A brake assembly having a brake spider that may receive an anchor pin or a sleeve that receives an anchor pin. Features such as splines may be provided with the anchor pin to help secure the anchor pin to the brake spider or the sleeve. Engagement features may be provided with the sleeve to help secure the sleeve to the brake spider.

20 Claims, 5 Drawing Sheets

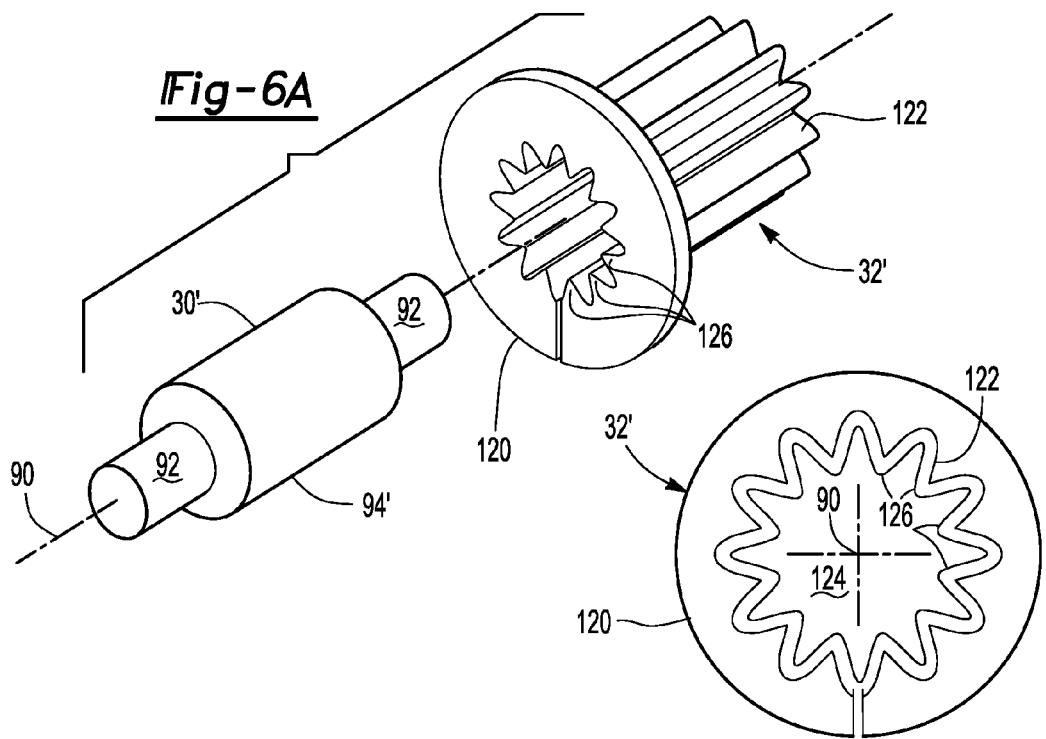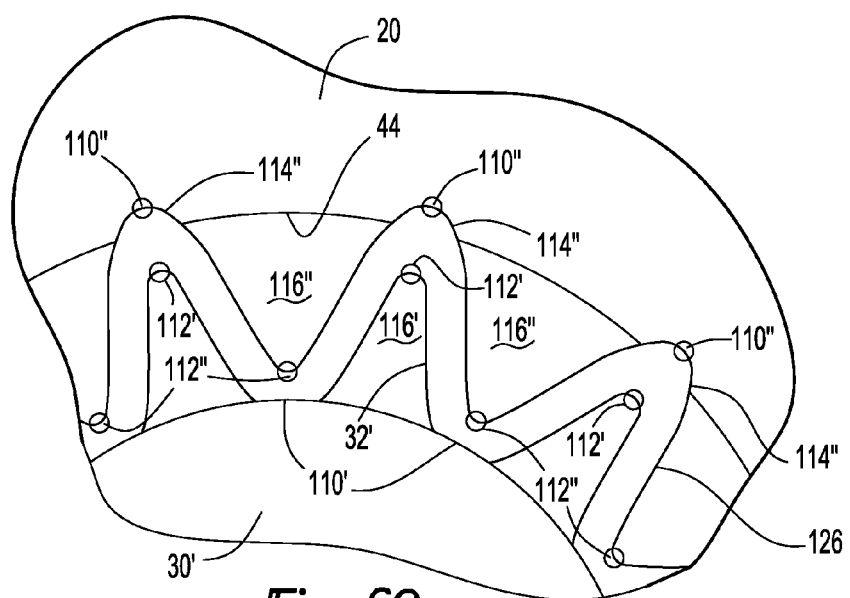

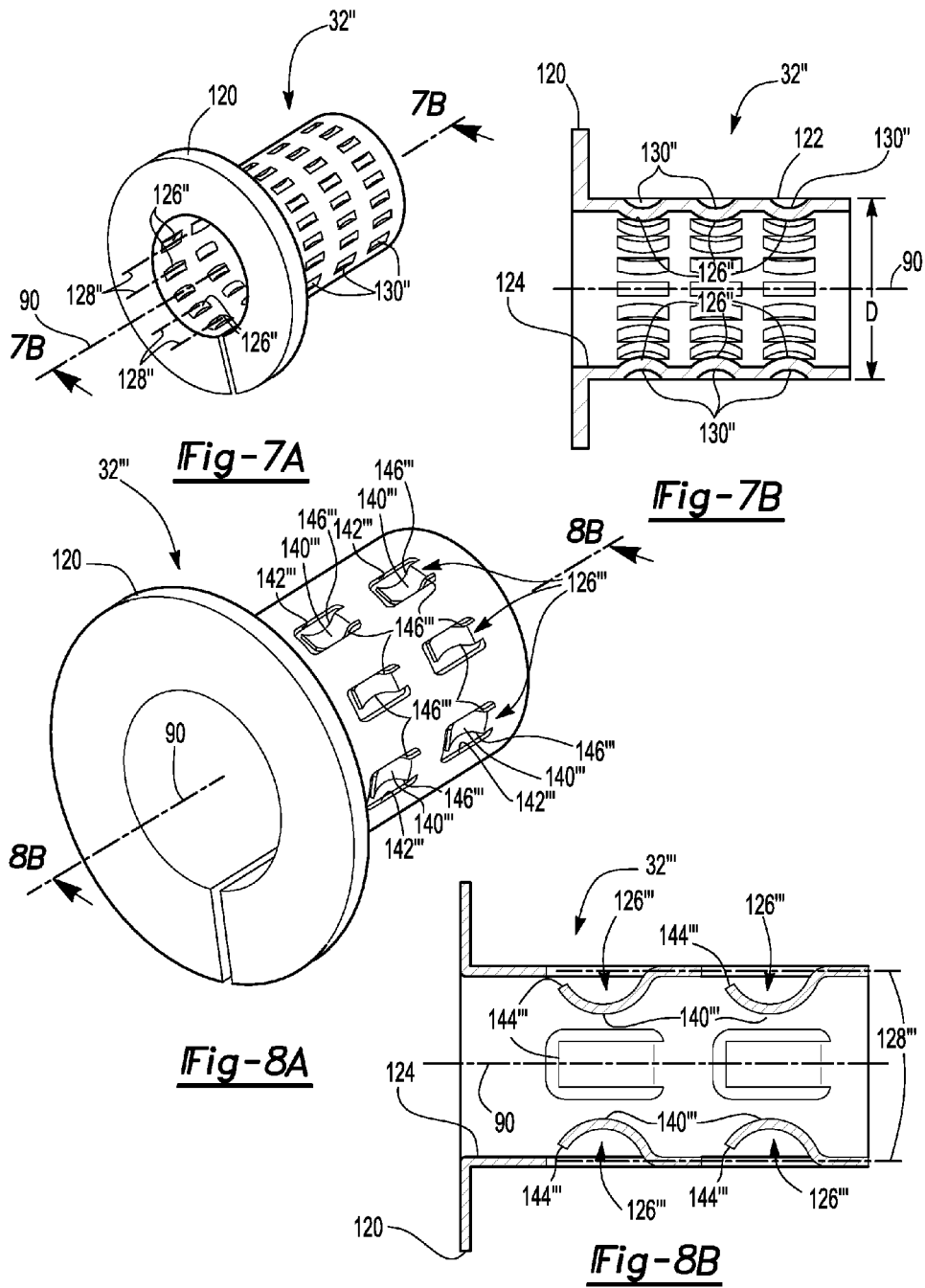

US 9,945,434 B2

BRAKE ASSEMBLY WITH ANCHOR PIN RETENTION

TECHNICAL FIELD

This disclosure relates to a brake assembly that has a brake spider that has a mounting hole that may receive an anchor pin or a sleeve that receives an anchor pin.

BACKGROUND

A brake assembly having a brake shoe and an anchor pin is disclosed in U.S. Pat. No. 9,004,224.

SUMMARY

In at least one embodiment, a brake assembly is provided. The brake assembly may have a brake spider and an anchor pin. The brake spider may have a mounting hole. The anchor pin may be disposed in the mounting hole. The anchor pin may extend along an axis and may have a set of splines. The splines may engage the brake spider in the mounting hole and may extend substantially parallel to the axis. The splines may deform the brake spider when the anchor pin is inserted into the mounting hole.

In at least one embodiment, a brake assembly is provided. The brake assembly may include a brake spider, a sleeve, and an anchor pin. The brake spider may have a mounting hole. The sleeve may be received in the mounting hole and may have a sleeve hole. The anchor pin may be disposed in the sleeve hole and may extend along an axis. The anchor pin may have a set of splines that may engage the sleeve in the sleeve hole and may extend substantially parallel to the axis. The splines may deform the sleeve when the anchor pin is inserted into the sleeve hole.

In at least one embodiment, a brake assembly is provided. The brake assembly may include a brake spider, a sleeve, and an anchor pin. The brake spider may have a mounting hole. The sleeve may be received in the mounting hole and may have a sleeve hole that may extend along an axis. The sleeve may have a set of engagement features that may be disposed in the sleeve hole and that may extend toward the axis. The anchor pin may be received in the sleeve hole and may be engaged by the set of engagement features.

BRIEF DESCRIPTION OF THE DRAWINGS

FIG. 6A is an exploded view of a portion of the brake assembly showing an anchor pin and a second sleeve.

FIG. 6B is an end view of the second sleeve of FIG. 6A.

FIG. 6C is a magnified view of a portion of the brake assembly showing the second sleeve received in the brake spider.

FIG. 7A is a perspective view of a third sleeve that may be provided with the brake assembly.

FIG. 7B is a section view of the third sleeve along line 7B-7B.

FIG. 8A is a perspective view of a fourth sleeve that may be provided with the brake assembly.

FIG. 8B is a section view of the third sleeve along line 8B-8B.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
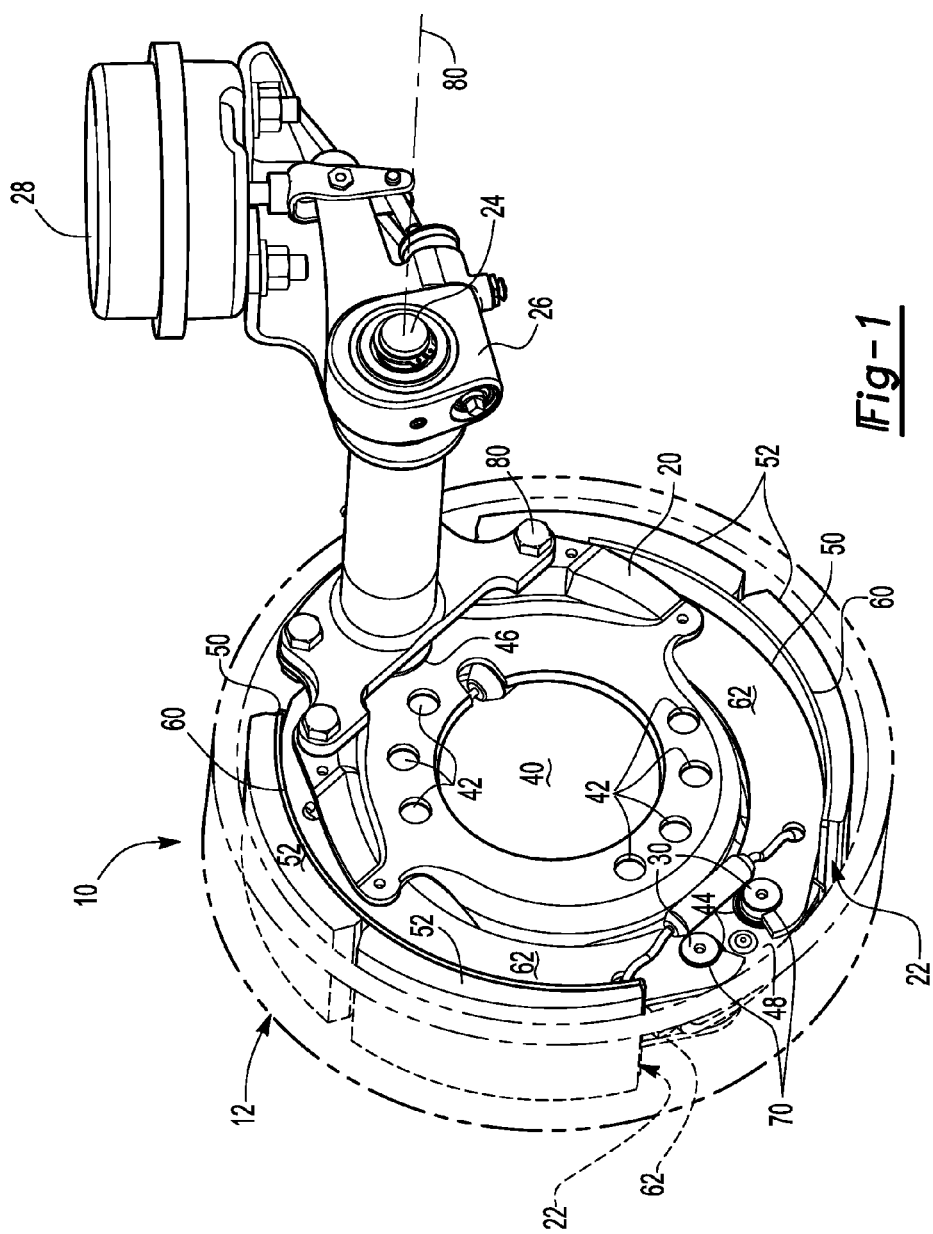
FIG. 1 is a perspective view of a brake assembly.

Referring to FIG. 1, an exemplary brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In addition, the brake assembly 10 may be provided on a trailer that may be coupled to or provided with a motor vehicle.

Figure 4:
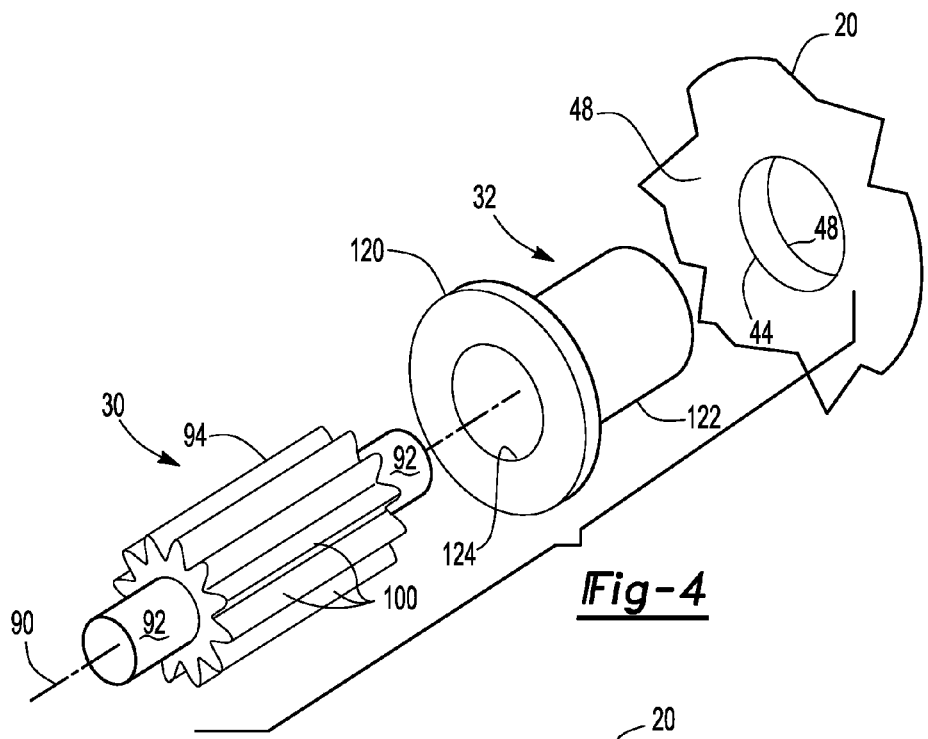
FIG. 4 is an exploded view of a portion of the brake assembly showing the anchor pin, a sleeve, and the brake spider.

The brake assembly 10 may be a friction brake that may be configured to slow or inhibit rotation of at least one associated wheel. In FIG. 1, the brake assembly 10 is depicted as a drum brake. In a drum brake configuration, a brake drum 12 may extend continuously around brake pad assemblies that may be actuated to engage the brake drum 12 and slow the rotation of a wheel associated with the brake drum 12. The brake drum 12 may be disposed between the wheel and a wheel hub assembly or wheel hub assembly that may rotatably support the wheel. The brake drum 12 is outlined in phantom lines in FIG. 1 to more clearly show other components of the brake assembly 10. In at least one embodiment, the brake assembly 10 may include a brake spider 20, at least one brake pad assembly 22, a camshaft 24, a slack adjuster 26, and an actuator 28, at least one anchor pin 30, and optionally a sleeve 32, an example of which is shown in FIG. 4.

Figure 2:
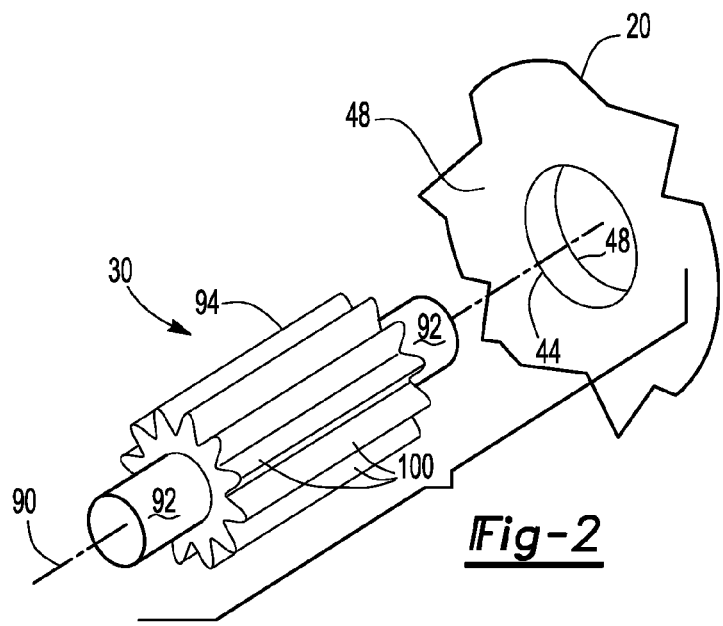
FIG. 2 is an exploded view of a portion of the brake assembly showing an anchor pin and a brake spider.

Referring to FIGS. 1 and 2, the brake spider 20 is shown in more detail. The brake spider 20 may support various components of the brake assembly 10. In addition, the brake spider 20 may facilitate mounting of the brake assembly 10 to the vehicle. For example, the brake spider 20 may be fixedly disposed on an axle assembly or steering knuckle or may be fixedly disposed with respect to an axle assembly or steering knuckle. In at least one embodiment, the brake spider 20 may be generally ring-shaped and may include an opening 40 through which an axle and/or a spindle may extend. For example, a spindle may extend through the opening 40 and may support one or more wheel bearings that may support and facilitate rotation of a wheel hub assembly. The brake spider 20 may also include at least one spider mounting hole 42, at least one mounting hole 44, a camshaft opening 46, and a pair of opposing side surfaces 48.

A spider mounting hole 42 may facilitate mounting of the brake spider 20 to the vehicle. A plurality of spider mounting holes 42 may be arranged around the opening 40. The spider mounting hole 42 may receive a fastener, such as a bolt, that may extend through the spider mounting hole 42 and couple the brake spider 20 to an axle assembly or steering knuckle.

The spider mounting holes 42 may be through holes that may extend between the pair of side surfaces 48.

The mounting hole 44 may receive an anchor pin 30 and optionally a sleeve that may facilitate mounting of a brake pad assembly 22 to the brake spider 20 will be discussed in more detail below. In FIG. 1, two mounting holes 44 are provided that are generally located on the brake spider 20 opposite the camshaft opening 46. Each mounting hole 44 may receive a different anchor pin 30, which in turn may support a brake pad assembly 22. As is best shown in FIG. 2, the mounting hole 44 may be a through hole that may extend between the pair of side surfaces 48 or from one side surface 48 to the opposite side surface 48.

The camshaft opening 46 may receive the camshaft 24. More specifically, the camshaft 24 may extend through the camshaft opening 46 and may be configured to actuate a cam roller that may support a corresponding brake pad assembly 22. The camshaft opening 46 may be a through hole that may extend between the pair of side surfaces 48.

The brake pad assembly 22 may be configured to slow or inhibit the rotation of a wheel or wheel end assembly. In FIG. 1, two brake pad assemblies 22 are shown. Each brake pad assembly 22 may include a brake shoe 50 and friction material 52.

The brake shoe 50 may be a structural member of a brake pad assembly 22 and may facilitate mounting of the brake pad assembly 22 to the brake spider 20. The brake shoe 50 may include a table 60 and one or more webs 62.

The table 60 may be configured to support the friction material 52. The table 60 may be curved or extend along an arc that may have a substantially constant radius.

One or more webs 62 may extend from the table 60. In FIG. 1, two webs 62 are shown that extend from the table 60 and are disposed on opposite sides of the brake spider 20. The webs 62 may have the same or similar configurations. The webs 62 may be mounted to the table 60 in any suitable manner, such as by welding or with one or more fasteners. Each web 62 may have a first end that may be disposed proximate the anchor pin 30 and a second end that may be disposed proximate the camshaft 24. For instance, each web 62 may have an anchor pin slot 70 that may receive the anchor pin 30. The anchor pin slot 70 may have any suitable configuration. For instance, the anchor pin slot 70 may be an open ended slot that may extend from the first end of the web 62 or may be a through hole that may be spaced apart from the first end of the web and may be completely defined within the web 62. In FIG. 1, the anchor pin slot 70 is configured as a generally semispherical open-ended slot that extends from the first end of each web 62.

The friction material 52, which may also be called a brake lining, may be disposed on the brake shoe 50. More specifically, the friction material 52 may be fixedly disposed on the table 60 and may face toward the brake drum 12. The friction material 52 may engage the brake drum 12 during vehicle braking and may be spaced apart from the brake drum 12 when the friction braking is not being applied.

The camshaft 24 may be configured to actuate the brake pad assemblies 22. The camshaft 24 may extend along and may rotate about a camshaft axis 80. In addition, the camshaft 24 may extend through the camshaft opening 46 in the brake spider 20. The camshaft 24 may include a cam disposed at a first end. The cam may be an S-cam and may be configured to engage and support one or more cam rollers that may be disposed between the brake shoe 50 and the cam. Rotation of the camshaft 24 about the camshaft axis 80 in a first direction may actuate cam rollers and the brake pad assemblies 22 such that the friction material 52 moves toward or engages an inner surface of the brake drum 12 to brake or slow or inhibit rotation of an associated wheel or wheel end assembly.

The slack adjuster 26 may be provided to compensate for brake wear or wear of the friction material 52. The slack adjuster 26 may operatively connect the actuator 28 to the camshaft 24. For instance, the slack adjuster 26 may be disposed near the second end of the camshaft 24. The slack adjuster 26 may be coupled to the camshaft 24 in any suitable manner. As an example, a mounting hole of the slack adjuster 26 and the camshaft 24 may have mating splines that may help couple the slack adjuster 26 to the camshaft 24.

The actuator 28 may be provided to actuate the camshaft 24 and the brake pad assemblies 22. The actuator 28 may be of any suitable type, such as a pneumatic, hydraulic, electrical, or electromechanical actuator. The actuator 28 may move between a retracted position and an extended position. In the retracted position, the camshaft 24 may be positioned such that a brake pad assembly 22 does not engage the brake drum 12 to brake or inhibit rotation of an associated wheel. In the extended position, the camshaft 24 may rotate about the camshaft axis 80 and may be positioned such that a brake pad assembly 22 moves toward and engages the brake drum 12 to inhibit rotation of an associated wheel hub assembly.

Referring to FIGS. 1 and 2, the anchor pin 30 may support and facilitate mounting of a brake pad assembly 22 to the brake spider 20. The anchor pin 30 may be a separate component from the brake spider 20 and may be fixedly received in the mounting hole 44 such that the anchor pin 30 does not rotate or move with respect to the brake spider 20. Thus, movement of the anchor pin 30 with respect to the brake spider 20 may be inhibited or eliminated, which in turn may inhibit or eliminate undesirable noise that can occur when the anchor pin 30 moves with respect to the brake spider 20. In FIGS. 1 and 2, the anchor pin 30 engages the brake spider 20 in the mounting hole 44. Alternatively, the anchor pin 30 may be received in and may engage a sleeve 32 as shown in FIG. 4, which in turn may be fixedly received in the mounting hole 44 of the brake spider 20 as will be discussed in more detail below.

The anchor pin 30 may be made of any suitable material. For instance, the anchor pin 30 may be made of a material like stainless steel that may resist corrosion that may otherwise bond the anchor pin 30 to the brake spider 20 or the sleeve 32 (if provided). As such, the anchor pin 30 may be made of a different material than the brake spider 20 and the sleeve 32 in one or more embodiments. In addition, the anchor pin 30 may have a greater hardness than the brake spider 20 or a region of the brake spider 20 that defines the mounting hole 44. The anchor pin 30 may extend along an axis 90 and may have a pair of end portions 92 and a body portion 94.

The end portions 92 may extend from opposite ends of the body portion 94. The end portions 92 may be centered with respect to the axis 90 and may be substantially cylindrical in one or more embodiments. Each end portion 92 may be received in a corresponding anchor pin slot 70 in a web 62. In addition, each end portion 92 may extend outwardly from of a mounting hole 44 of the brake spider 20 or may be disposed outside of the mounting hole 44 of the brake spider 20 and outside of the sleeve 32, if provided.

The body portion 94 may be received in the mounting hole 44 and may engage the brake spider 20. The body portion 94 may extend further from the axis 90 than the end portions 92 and may have a larger diameter than an end portion 92. In addition, the body portion 94 may be provided without holes or recesses that may receive a separate fastener, such as a pin or bolt, that may otherwise be provided to couple an anchor pin to the brake spider 20.

The body portion 94 may be provided in various configurations. In FIGS. 2-5, the body portion 94 has a set of splines 100. The splines 100 may be arranged around the axis 90. In at least one embodiment, the splines 100 may extend substantially parallel to the axis 90 and may extend continuously across the body portion 94.

Figure 3:
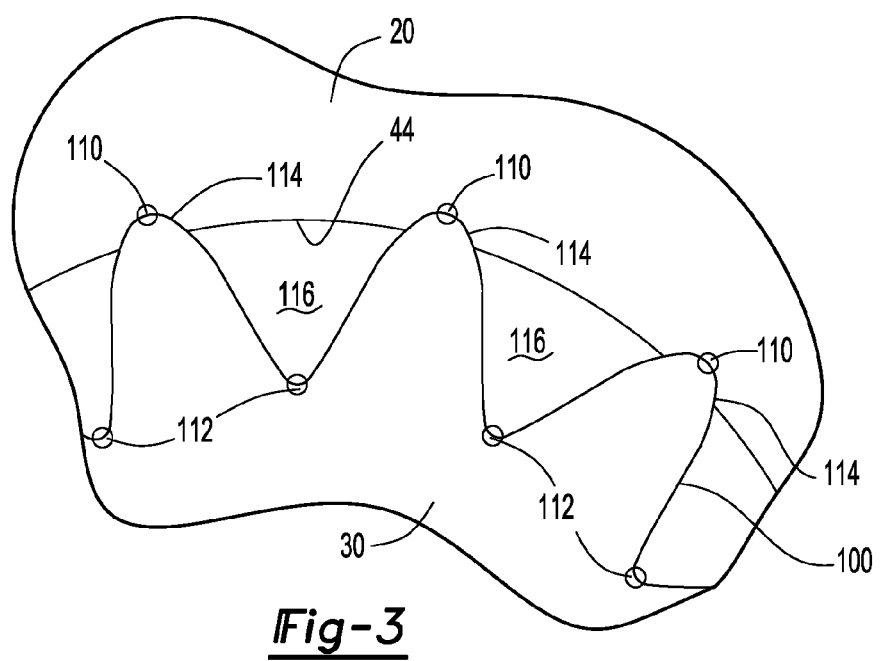
FIG. 3 is a magnified view of a portion of the brake assembly showing the anchor pin received in the brake spider.

The splines 100 may have a greater hardness than the brake spider 20. As such, the splines 100 may deform the brake spider 20 when the anchor pin 30 is inserted into the mounting hole 44. This is best illustrated by comparing FIG. 2 and FIG. 3. In FIG. 2, the mounting hole 44 of the brake spider 20 is shown with a substantially circular shape before receiving the anchor pin 30. In FIG. 3, a magnified view is shown illustrating deformation of the mounting hole 44 by the splines 100 of the anchor pin 30. The splines 100 may be sufficiently large or extend sufficiently far from the axis 90 to deform the brake spider 20 and accommodate design tolerances associated with the hole that receives the anchor pin 30 (e.g., each spline 100 may engage the component in which it is received). In addition, the splines 100 may help reduce stress on the brake spider 20 as compared to an anchor pin that engages and is pressed directly into a mounting hole in the brake spider 20.

Referring to FIG. 3, each spline 100 may have a peak 110 and a pair of troughs 112. More specifically, each spline 100 may extend from one trough 112 to an adjacent trough 112 and may include one peak 110.

The peak 110 may be a point or region of the spline 100 that is located furthest from the axis 90. As such, the peak 110 may be disposed at the greatest radial distance from the axis 90 or may be disposed furthest from the axis 90 in a radial direction. The peak 110 of each spline 100 or area immediately adjacent to the peak 110 may deform the brake spider 20 and/or remove material from the brake spider 20 to form a groove 114 in the brake spider 20 when the anchor pin 30 is inserted into the mounting hole 44. The groove 114 may extend axially or substantially parallel to the axis 90.

The trough 112 may be a point or region of the spline 100 that is located closest to the axis 90. Each trough 112 may be located where two adjacent splines 100 meet.

As is best shown in FIG. 3, a gap 116 may be provided between adjacent splines 100. The gap 116 may be located between the brake spider 20 and the trough 112 when the anchor pin 30 is received in the mounting hole 44. As such, one or more troughs 112 may be spaced apart from and may not engage the brake spider 20 in one or more embodiments.

Figure 5:
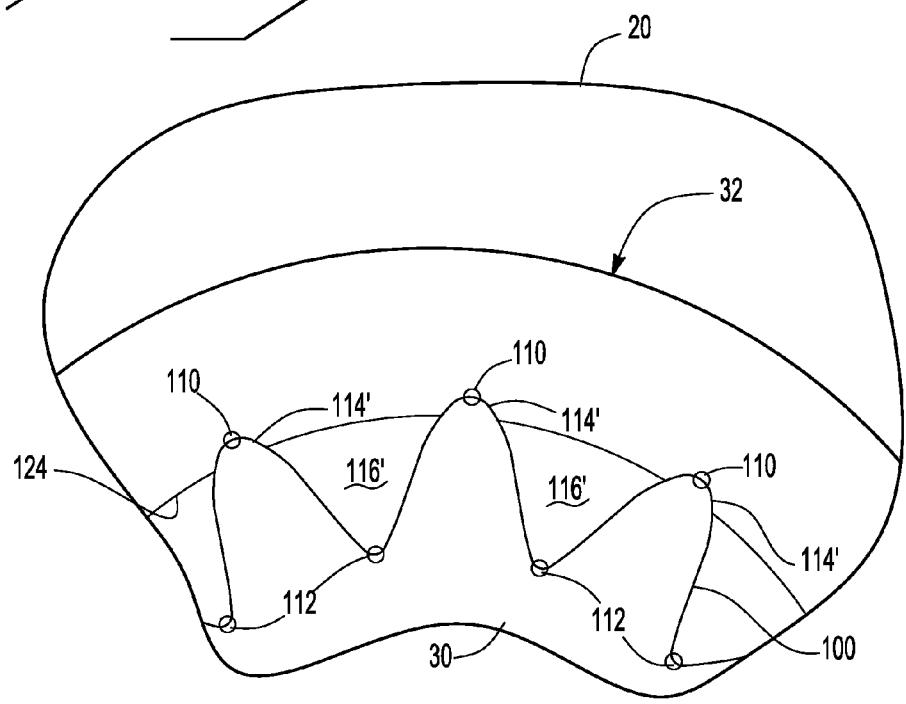
FIG. 5 is a magnified view of a portion of the brake assembly of FIG. 4 showing the anchor pin received in the sleeve.

Referring to FIGS. 4 and 5, another configuration is shown in which the anchor pin 30 is received in a sleeve 32. More specifically, the anchor pin 30 may be received in the sleeve 32 such that the anchor pin 30 is fixedly positioned with respect to the sleeve 32, thereby inhibiting or eliminating movement of the anchor pin 30 with respect to the sleeve 32 that may otherwise cause undesirable noise. The sleeve 32 may be fixedly attached to the brake spider 20. For example, the sleeve 32 may be press fit into the mounting hole 44 such that the sleeve 32 may not move with respect to the brake spider 20. The sleeve 32 may be a separate component from the brake spider 20 and the anchor pin 30. In addition, the sleeve 32 may extend around the anchor pin 30 such that the anchor pin 30 does not engage the brake spider 20. As such, the sleeve 32 may engage the brake spider 20 when the anchor pin 30 may engage the sleeve 32.

In at least one embodiment, the sleeve 32 may extend along the axis 90 and may have a flange 120, a body 122, and a sleeve hole 124.

The flange 120 may be disposed at a first end of the sleeve 32. The flange 120 may extend away from the axis 90. For instance, the flange 120 may extend substantially perpendicular to the axis 90 and may be configured as a ring that may extend continuously around the axis 90 in one or more embodiments. The flange 120 may engage a side surface 48 of the brake spider 20 to inhibit axial movement of the sleeve 32 or movement along the axis 90 in at least one direction. It is also contemplated that the flange 120 may be omitted in one or more embodiments.

The body 122 may extend along the axis 90. For example, the body 122 may extend from the flange 120 to a second end of the sleeve 32 that may be disposed opposite the first end. The body 122 may engage the brake spider 20 in the mounting hole 44.

The sleeve hole 124 may extend along and may be radially disposed about the axis 90. The flange 120 and the body 122 may cooperate to define the sleeve hole 124. The anchor pin 30 may be disposed in the sleeve hole 124 such that the anchor pin 30 and the sleeve 32 may be substantially coaxially disposed along the axis 90.

The anchor pin 30 may be made of a different material than the sleeve 32 and/or may have a greater hardness than the sleeve 32 or a region of the sleeve 32 that defines the sleeve hole 124. For example, the splines 100 may have a greater hardness than the sleeve 32. As such, the splines 100 may deform the sleeve 32 when the anchor pin 30 is inserted into the sleeve hole 124 as is best illustrated by comparing FIG. 4 and FIG. 5. In FIG. 4, the sleeve hole 124 of the sleeve 32 is shown as being substantially circular before receiving the anchor pin 30. In FIG. 5, the sleeve hole 124 is deformed by the splines 100 of the anchor pin 30. The peak 110 of each spline 100 or region adjacent to the peak 110 may deform the sleeve 32 and/or remove material from the brake spider 20 to form a groove 114' in the sleeve 32 when the anchor pin 30 is inserted into the sleeve hole 124. A gap 116' may be located between adjacent splines 100 and between the sleeve 32 and the trough 112 when the anchor pin 30 is received in the sleeve hole 124. As such, one or more troughs 112 may be spaced apart from and may not engage the sleeve 32 in one or more embodiments.

Referring to FIGS. 6A-6C, another configuration is shown in which the anchor pin 30' is received in a sleeve 32'. As before, the anchor pin 30' may be received in the sleeve 32' such that the anchor pin 30' is fixedly positioned with respect to the sleeve 32', thereby inhibiting or eliminating movement of the anchor pin 30' with respect to the sleeve 32' that may otherwise cause undesirable noise.

The anchor pin 30' may have substantially cylindrical body portion 94' that may not include splines. As such, the body portion 94' may have an outer surface that may be radially disposed with respect to the axis 90. As before, the body portion 94' may be provided without holes or recesses that may receive a separate fastener, such as a pin or bolt, that may otherwise be provided to couple the anchor pin to another component.

The sleeve 32' may be fixedly attached to the brake spider 20. For example, the sleeve 32' may be press fit into the mounting hole 44 such that the sleeve 32' may not move with respect to the brake spider 20. The sleeve 32' may be a separate component from the brake spider 20 and the anchor pin 30'. In addition, the sleeve 32' may extend around the anchor pin 30' such that the anchor pin 30' does not engage the brake spider 20. As such, the sleeve 32' may engage the brake spider 20 while the anchor pin 30' may engage the sleeve 32'. In at least one embodiment, the sleeve 32' may extend along the axis 90 and may have a flange 120, a body 122, a sleeve hole 124, and a set of engagement features 126.

The set of engagement features 126 may be disposed in the sleeve hole 124 and may extend toward the axis 90. The anchor pin 30' may be received in the sleeve hole 124 and may be engaged by the set of engagement features 126. Each member of the set of engagement features 126 may be configured as a spline that may extend substantially parallel to the axis 90 from the first end to the second end of the sleeve 32'. The splines may be arranged around the axis 90 in a repeating serpentine arrangement when viewed from the first and/or the second end of the sleeve 32' or when viewed along the axis 90. The engagement features 126 may also form splines that may face away from the axis 90 and may help fixedly couple the sleeve 32' to the brake spider 20 in the mounting hole 44. The engagement features 126 or splines may have peaks 110' and troughs 112' that engage the anchor pin 30' like those previously discussed. The troughs 112' may engage the outside circumference and may be deformed or flattened when the sleeve 32' receives the anchor pin 30' since the anchor pin 30' may have a greater hardness than the sleeve 32'. In addition, the engagement features 126 or splines may have external peaks 110" and external troughs 112". The external peaks 110" may deform the brake spider 20 and/or remove material from the brake spider 20 to form a groove 114" in the brake spider 20 when the sleeve 32' is inserted into the mounting hole 44 of the brake spider 20. Each external trough 112" may be disposed opposite an external peak 110". A gap 116" may be located between the brake spider 20 and the trough 112" when the sleeve 32' is received in the mounting hole 44.

Referring to FIGS. 7A and 7B, another configuration of a sleeve 32" is shown. In this embodiment, the engagement features 126" of the sleeve 32" may be arranged along engagement feature axes 128". The engagement feature axes 128" may be arranged around the axis 90. In addition, the engagement feature axes 128" may be disposed substantially parallel to the axis 90. As is best shown in FIG. 7B, the engagement features 126" may be arranged in a repeating serpentine arrangement along each engagement feature axis 128". Multiple engagement features 126" may be arranged along each engagement feature axis 128" between the flange 120 and the second end of the sleeve 32" that is disposed opposite the flange 120. As is best shown in FIG. 7A, the engagement features 126" may be formed by providing indentations 130" in the exterior surface of the body 122 that extend toward the axis 90. These indentations 130" may then form engagement features 126" that are configured as protrusions that extend toward the axis 90. In FIGS. 7A and 7B, the engagement features 126" are configured as rounded bumps that are spaced apart from each other. As is best shown in FIG. 7B, the sleeve 32" may have a substantially constant outside diameter D between rows of engagement features 126" or where indentations 130" and engagement features 126" are not provided in the body 122.

Referring to FIGS. 8A and 8B, another configuration of a sleeve 32''' is shown. In this embodiment, each member of the set of engagement features 126''' is configured as an arm 140''' that is cantilevered from the body 122. More specifically, the body 122 may include a plurality of arms 140''' that may be arranged along engagement feature axes 128''' as previously discussed. Each arm 140''' may be disposed in a corresponding arm opening 142'''. The arm opening 142''' may extend through the body 122 and may extend around the arm 140''' such that one end of the arm 140''' may extend from the body 122 while the arm 140''' does not engage the body 122 in the arm opening 142'''. As such, a free end or distal end 144''' of the arm 140''' that may be disposed opposite where the arm 140''' extends from the body 122 as well as opposing lateral sides 146''' of the arm 140''' that extend from the body 122 to the distal end 144''' may not engage the body 122. As is best shown in FIG. 8B, the arm 140''' may extend from the body 122 to a distal end 144''' and may be curved toward the axis 90 between the body 122 and the distal end 144''' or may be concave with respect to the exterior surface of the body 122. In addition, each arm 140''' may extend from the body 122 toward the flange 120. As such, the distal end 144''' of each arm 140''' may be disposed closer to the flange 120 than the remainder of the arm 140''', such as where the arm 140''' extends from the body 122.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a brake spider having a mounting hole;
   a sleeve that is received in the mounting hole, the sleeve having a sleeve hole; and
   an anchor pin that is disposed in the sleeve hole, wherein the anchor pin extends along an axis and has a set of splines that engage the sleeve in the sleeve hole and extend substantially parallel to the axis, wherein each member of set of splines has a peak that is radially disposed furthest from the axis that deforms the sleeve to form a groove in the sleeve when the anchor pin is inserted into the sleeve hole.

2. The brake assembly of claim 1 wherein the sleeve extends around the anchor pin such that the anchor pin does not engage the brake spider and the anchor pin has a greater hardness than the sleeve.

3. The brake assembly of claim 1 wherein the sleeve has a flange that extends away from the axis and is disposed at a first end of the sleeve and a body that extends from the flange to a second end of the sleeve that is disposed opposite the first end.

4. The brake assembly of claim 3 wherein the body engages the brake spider in the mounting hole and the flange engages a side surface of the brake spider to inhibit axial movement of the sleeve.

5. The brake assembly of claim 3 wherein the sleeve hole extends along the axis.

6. The brake assembly of claim 5 wherein the sleeve hole is cylindrical.

7. The brake assembly of claim 5 wherein the sleeve has a substantially constant outside diameter.

8. The brake assembly of claim 1 wherein the splines are arranged around the axis in a repeating arrangement.

9. The brake assembly of claim 1 wherein the anchor pin includes a body portion and end portions that extend from opposite ends of the body portion, wherein the splines are provided with the body portion.

10. A brake assembly comprising:
    a brake spider having a mounting hole;
    a sleeve that is received in the mounting hole, the sleeve having a sleeve hole; and an anchor pin that is disposed in the sleeve hole, wherein the anchor pin extends along an axis and has a set of splines that engage the sleeve in the sleeve hole and extend substantially parallel to the axis, wherein the set of splines deforms the sleeve when the anchor pin is inserted into the sleeve hole and each spline has a peak that is radially disposed furthest from the axis and a trough that is radially disposed closest to the axis, wherein the peak deforms the sleeve to form a groove in the sleeve when the anchor pin is inserted into the sleeve hole.

11. The brake assembly of claim 10 wherein the trough is located where two adjacent splines meet and a gap is provided between the sleeve and the trough when the anchor pin is received in the sleeve hole.

12. The brake assembly of claim 10 wherein the anchor pin includes a body portion and a pair of end portions that extend from opposite ends of the body portion, wherein outside circumferences of the end portions are radially disposed closer to the axis than the trough.

13. The brake assembly of claim 10 wherein the sleeve extends around the anchor pin such that the anchor pin does not engage the brake spider and the anchor pin has a greater hardness than the sleeve.

14. The brake assembly of claim 10 wherein the splines are arranged around the axis in a repeating arrangement.

15. The brake assembly of claim 10 wherein the sleeve has a flange that extends away from the axis and is disposed at a first end of the sleeve and a body that extends from the flange to a second end of the sleeve that is disposed opposite the first end.

16. The brake assembly of claim 10 wherein the anchor pin includes a body portion and a pair of end portions that extend from opposite ends of the body portion, wherein outside circumferences of the end portions are radially disposed closer to the axis than the trough.

17. The brake assembly of claim 10 wherein the anchor pin does not rotate about the axis.

18. A brake assembly comprising:
a brake spider having a mounting hole;
a sleeve that is received in the mounting hole, the sleeve having a sleeve hole; and
an anchor pin that is disposed in the sleeve hole, wherein the anchor pin extends along an axis and has a body portion, end portions that extend from opposite ends of the body portion, and a set of splines provided with the body portion that engage the sleeve in the sleeve hole and extend substantially parallel to the axis, wherein the set of splines deforms the sleeve when the anchor pin is inserted into the sleeve hole and wherein the end portions are cylindrical and disposed closer to the axis than the splines.

19. The brake assembly of claim 18 wherein the anchor pin does not rotate about the axis.

20. The brake assembly of claim 18 wherein the sleeve has a flange that extends away from the axis and is disposed at a first end of the sleeve and a body that extends from the flange to a second end of the sleeve that is disposed opposite the first end.

* * * * *